United States Patent

[11] 3,574,377

[72] Inventor William H. Petitt
 Chattanooga, Tenn.
[21] Appl. No. 786,784
[22] Filed Dec. 24, 1968
[45] Patented Apr. 13, 1971
[73] Assignee The Harriman Manufacturing Company
 Chattanooga, Tenn.
 Continuation-in-part of application Ser. No.
 356,418, Apr. 1, 1964.

[54] CUSHIONED JOINT OF MODULAR IRON TO STEEL
 2 Claims, 7 Drawing Figs.
[52] U.S. Cl. .................................................. 287/189.36,
 29/470, 52/397
[51] Int. Cl. .................................................. F16b 5/08
[50] Field of Search ........................................ 287/189.36
 (B), 20.2; 52/397, 401, 573; 94/18; 29/470, 470.3,
 470.5, 470.9, 471.1, 497.5, 195.5, 195, 196, 501,
 493, 491, 487; 161/94; 117/126 (I); 219/118, 137

[56] References Cited
 UNITED STATES PATENTS
 2,038,439 4/1936 Moss .......................... 29/470X

| 2,143,033 | 1/1939 | Sakier | 52/401X |
| 2,376,574 | 5/1945 | Collins | 287/189.36BX |
| 3,137,937 | 6/1964 | Cowan et al. | 29/497.5X |
| 3,346,248 | 10/1967 | Martinet et al. | 52/573X |
| 2,362,505 | 11/1944 | Smith | 29/491X |

FOREIGN PATENTS

| 1,201,696 | 9/1965 | Germany | 52/401 |

Primary Examiner—David J. Williamowsky
Assistant Examiner—Wayne L. Shedd
Attorney—Semmes & Semmes ABSTRACT: This is a cushioned joint, fabricated from materials having different coefficients of thermal expansion and contraction, in particular a welding of nodular iron to steel.

A surface on a member made of one of the materials is positioned adjacent a surface of a second member made of the other material. A cushioning means is positioned between the two surfaces spacing the one surface from the other. The members are then welded together at positions distal from the cushioning means and the latter provides space for relative movement between the members due to their differing coefficients of thermal contraction as they cool after the welding is completed.

PATENTED APR 13 1971 3,574,377

Inventor

WILLIAM H. PETITT

By

Semmes & Semmes
Attorney

Inventor
WILLIAM H. PETITT

By
Semmes & Semmes  Attorney 3,574,377

CUSHIONED JOINT OF MODULAR IRON TO STEEL

CROSS-REFERENCES TO RELATED APPLICATIONS

This is a continuation-in-part of my copending patent application Ser. No. 356,418, filed Apr. 1, 1964 and entitled: METHOD FOR WELDING NODULAR IRON TO STEEL.

BACKGROUND OF THE INVENTION

Creating a joint or weld between materials having dissimilar characteristics of thermal expansion and contraction is a problem of long standing. It is desirable, of course, to unite the two materials by means of a bond or weld possessing inherent physical strength equal to or greater than that of the materials being welded. However, upon completion of the welding, dissimilar metals contract at different rates thus causing internal stresses resulting in cracking or weakening of the structure.

The present invention concerns a novel method of welding including the insertion of a cushion between the dissimilar materials at their intended point of juncture. The cushion, by virtue of its thermal and physical characteristics of contraction and compressibility permits the dissimilar materials to cool without weakening the joint. That is, the cushion accommodates the differential of contraction of the dissimilar materials. The cushion material may be fibrous, woven or solid as desired. In fact, it may even be made of a material combustible within the working temperature range. Asbestos, however, is the preferred material with which the cushions are made. The shape of the cushion may be corrugated or flat. A similar effect may be achieved with the use of projections from the mating surfaces of one or both of the component parts. In such case, the projections are of sufficient size to permit their embedding into the other material part upon the contraction of the materials during or after welding. This type of cushion offers resistance of a magnitude equivalent to the product of the area of the projection and the compressive strength of the component part. Stress relieving, when necessary in large welds, should be in the range of 850°- —1100° F. When only small welds are required, the upper limit of preheat may be exceeded and the welding accomplished before the temperature drops below the low limit of stress relieving.

The simplicity of the invention herein disclosed is believed to be an important improvement over the patent to Cook, U.S. Pat. No. 2,790,656, which is concerned with preparing a joint between metals having a great difference in fusion temperatures.

Accordingly, it is an object of the present invention to provide a method for welding materials having different coefficients of thermal expansion and contraction so as to prevent undesirable weakening of the weld or bond upon cooling.

Another object is to provide a method for welding nodular iron to steel with the use of a cushion which accommodates or compensates for the differential of contraction between the nodular iron and steel.

Yet additional objects of invention will become apparent from the ensuing specification and attached drawings.

DESCRIPTION OF THE PREFERRED EMBODIMENTS

Figure 1:
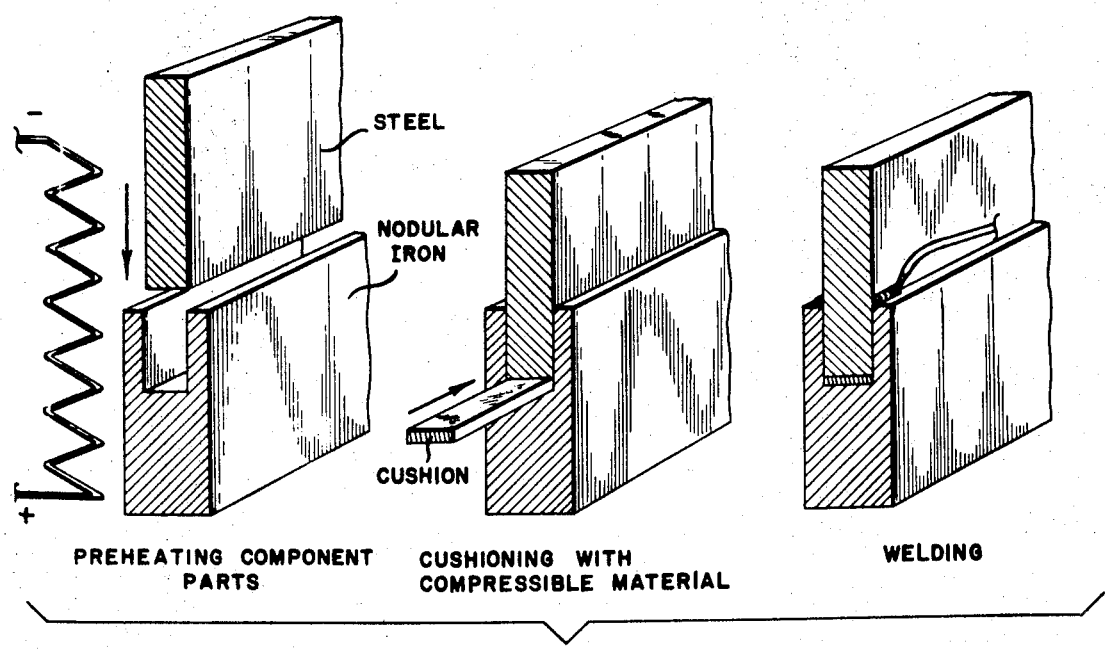
FIG. 1 is a perspective view showing schematically the method steps of preheating, inserting the cushion, and welding.
Figure 2:
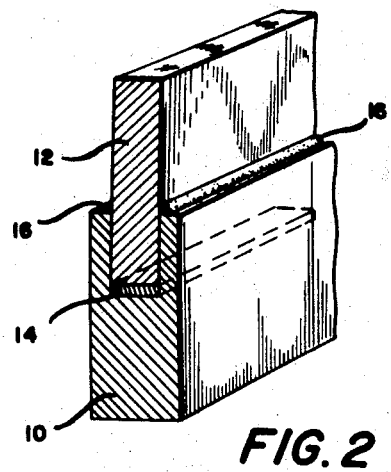
FIG. 2 is a perspective view of a section of nodular iron welded to steel showing the preferred embodiment of the cushion inserted in place.

As seen in FIGS. 1 and 2, the novel method of welding, and in particular the preferred shape of cushion employed in said method consists of a flat piece of asbestos inserted between a section of nodular iron 10 and a section of steel 12. As illustrated schematically in FIG. 1, the section of nodular iron 10 and/or the section of steel 12 are preheated by any conventional means such as electrical resistance as schematically shown, the flat asbestos cushion 14 inserted between the section of nodular iron 10 and that portion of steel member 12 lying adjacent thereto. Then, the nodular iron 10 and steel 12 are welded at joints or bonds 16 by means of a low hydrogen welding rod or other selected rod compatible with the analysis of the iron and steel components. The welder polarity can be normal or reversed in the method disclosed herein.

Figure 3:
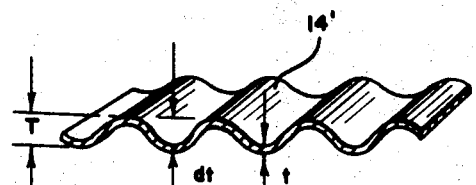
FIG. 3 is a perspective view of a modified embodiment of the cushion.

In the second embodiment of the novel cushion as illustrated by FIG. 3, the flat asbestos cushion 14 is replaced with corrugated cushion 14' which may, for convenience, be made from any suitable metal. With reference to the corrugated cushion, $T$ designates the cushion thickness before use, $t$ indicates the cushion thickness after use and $dt$ the difference of the coefficients of expansion and contraction and/or the normal shrinkage due to welding.

Figure 4:
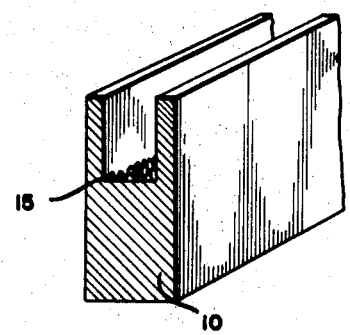
FIG. 4 is another modification of the cushion showing a series of projections on the mating surface of one of the component parts to be welded.

In a third embodiment of the novel cushion as illustrated in FIG. 4, numerous projections 15 of one or more of the component parts 10 provide the desirable cushioning effect. The cushion 15 offers resistance of a magnitude equivalent to the product of the area of the projection and the compression strength of the component parts.

Figure 7:
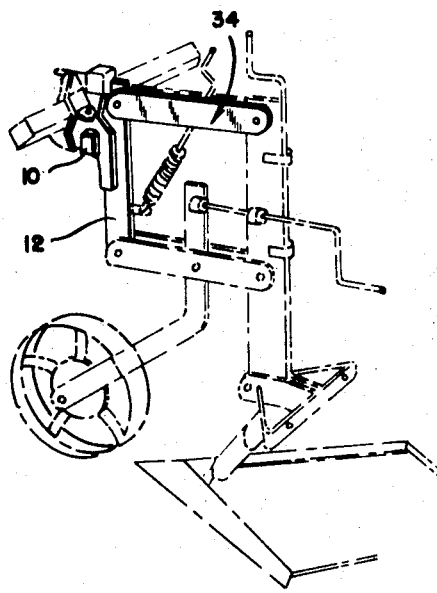
FIG. 7 is a perspective view showing an agricultural cultivator having two sections of a hitch frame welded together by applicant's inventive method.

The preferred shape of cushion 14 as seen in FIG. 2 is designed primarily for insertion between two sections of a hitch frame used in conjunction with an agricultural cultivator. As clearly seen in FIG. 7, the joint between nodular iron section 10 and steel section 12 of hitch frame 34 is subjected to great stress thus necessitating a weld of strength equal to or in excess of that of the hitch frame sections 10 and 12 such as is possible with the use of applicant's novel method of welding.

Figure 5:
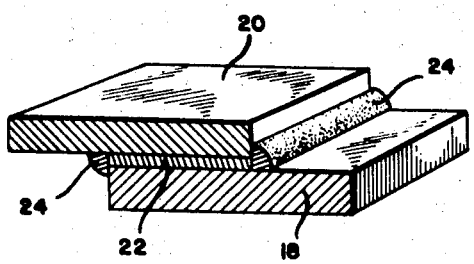
FIG. 5 is a perspective view showing the location of the preferred embodiment of the cushion where overlap welding is employed.
Figure 6:
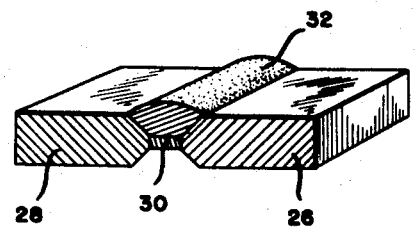
FIG. 6 is a perspective view showing the location of the preferred embodiment of the cushion where butt welding is employed.

As seen in FIGS. 5 and 6, applicant's novel method of welding including the insertion of an asbestos cushion may also be employed with conventional methods of "overlap" and "butt" welding.

In FIG. 5, the nodular iron 18 is "overlapped" by steel 20 with cushion 22 inserted between the points of overlapping. Then, the corners 24 are welded. In butt welding as shown in FIG. 6, the nodular iron 26 is separated from the steel 28 by cushion 30. Then, the joints 32 are welded.

Manifestly, reconfiguration of the cushions and application to different forms of welding may be employed without departing from the scope of invention, as defined in the subjoined claims.

I claim:

1. In a weld joint between the surfaces of first and second materials having different coefficients of thermal contraction, weld regions therebetween a series of projections of said first material from a portion of said first material to be welded to said second material external of the weld regions, said projections extending in a direction perpendicular from said surface of said portion of said first material a suitable distance to embed within said second material upon welding thus offering resistance to said contraction equal to the product of the areas of said projections and the compressive strength of said first material.

2. A joint of nodular iron and steel comprising:
A. a section of nodular iron having a first surface;
B. a section of steel having a second surface;
C. a compressible cushion located between said sections of nodular iron and steel and located in abutting contact relationship with and between said first and second surfaces; said cushion consisting of projections of nodular iron from said sections of nodular iron, said projections extending in a direction perpendicular to said first surface of said section of nodular iron a suitable distance to embed within said second surface of said steel section; and
D. weld material located adjacent and between said sections of nodular iron and steel at preselected points external of said cushion.